United States Patent [19]

Hanley

[11] 4,256,183
[45] Mar. 17, 1981

[54] DUAL END ROTARY TILLER BLADE

[76] Inventor: Martin G. Hanley, 2404 Centerline Industrial Dr., Maryland Heights, Mo. 63043

[21] Appl. No.: 18,723

[22] Filed: Mar. 8, 1979

[51] Int. Cl.³ .................. A01B 33/10; A01B 33/02
[52] U.S. Cl. .................................... 172/42; 172/123
[58] Field of Search ............... 172/42, 43, 540–556, 172/123

[56] References Cited

U.S. PATENT DOCUMENTS

| 998,480 | 7/1911 | Ekrem | 172/549 X |
| 2,477,662 | 8/1949 | Seaman | 172/556 X |
| 2,835,182 | 5/1958 | Smithburn | 172/43 |

FOREIGN PATENT DOCUMENTS

| 257010 | 5/1963 | Australia | 172/42 |
| 276828 | 7/1914 | Fed. Rep. of Germany | 172/549 |
| 1226200 | 2/1960 | France | 172/548 |
| 526051 | 5/1955 | Italy | 172/549 |
| 789092 | 1/1958 | United Kingdom | 172/123 |

Primary Examiner—Paul E. Shapiro
Attorney, Agent, or Firm—Michael Kovac

[57] ABSTRACT

A rotary tiller blade for mounting along with other similar blades, on a driven tiller shaft in a rotary tiller machine, which blade is configured and arranged to provide two cutting teeth per blade which enables a faster, smoother running and more thorough ground breaking action than any other tiller blade design.

5 Claims, 10 Drawing Figures

DUAL END ROTARY TILLER BLADE

SUMMARY OF THE INVENTION

There are two types of rotary tiller machines: front end tillers and rear end tillers. Each has their proponent. For example, front end tiller proponents correctly claim that their machines are lighter, less expensive and capable of operating in most soil conditions, while rear end tiller proponents correctly claim that their units are easier to handle and provide a more thorough ground breaking or pulverizing action.

By way of this invention, however, it has been discovered that the operation and efficiency of both type tillers, and in particular front end tillers, can be greatly enhanced by the dual end rotary tiller blades designed in accordance with the present invention.

Therefore, it is a general object of the present invention to provide a new and improved dual end rotary tiller blade design which can be used to improve the operating performance and efficiency of front or rear end tillers.

More specifically, it is an object of the present invention to provide a new and improved dual end tiller blade design which provides a faster, smoother running and more thorough ground breaking action; and in addition, is more economical and simpler to manufacture than other tiller blade designs.

These and other objects and advantages are attained by the provision of a rotary tiller blade for mounting, along with other similar blades, on a driven shaft in a rotary tiller machine, said blade comprising an elongated element with a flattened intermediate section, and oppositely directed cutting teeth adjacent the marginal end portions thereof.

DESCRIPTION OF THE PREFERRED EMBODIMENTS

Figures 1, 2:
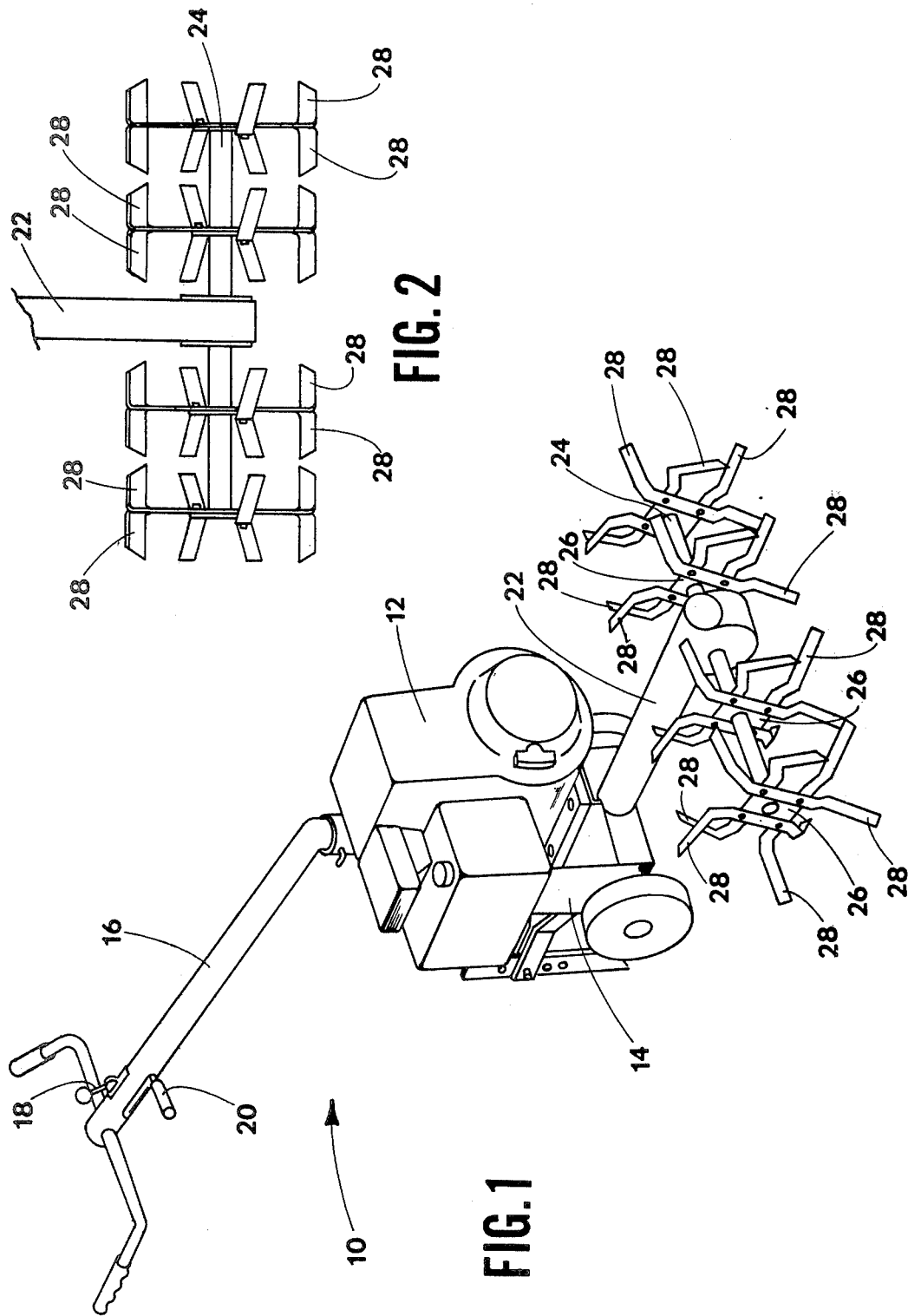
FIG. 1 is a perspective view of a front end tiller with a plurality of dual end rotary tiller blades, constructed in accordance with the present invention, mounted along the driven tiller shaft thereof.
FIG. 2 is a fragmentary top plan view of the dual end rotary tiller blade sub-assembly shown in FIG. 1.

The front end rotary tiller 10 shown in FIG. 1 of the drawings includes a motor 12 mounted on the frame 14, a handle 16 with governor control 18 and forward control 20, a worm gear 22, operated by the forward control 20, to drive the tiller blade shaft 24, and a plurality of tiller blade supports 26 for mounting the dual end rotary tiller blades 28, which are constructed in accordance with the teachings of the present invention.

As shown in FIGS. 1-2 of the drawings, there are four tiller blade supports 26, each of which have four rotary tiller blades 28 mounted thereon. Since each rotary tiller blade 28 is provided with two earth cutting teeth or sections, there will be sixteen rotary tiller blades 28 with thirty-two earth cutting teeth for engagement with the earth.

At the present time, the majority of tiller manufacturers use sixteen rotary tiller blades which have sixteen earth cutting teeth, although there is at least one manufacturer which has thirty-two blades with thirty-two cutting teeth. However, no one is known to have sixteen rotary tiller blades which provide thirty-two earth cutting teeth.

The advantages of thirty-two earth cutting teeth on sixteen rotary tiller blades include: faster tilling which substantially reduces tilling time, more thorough ground breaking or pulverization sometimes with the first pass of the rotary tiller, and smoother handling, particularly of front end tillers in various soil conditions. In addition, as will be seen from the ensuing discussion, the rotary tiller blades of the present invention do not have to be made in right and left hand configurations, but rather, are made in one standard blade configuration. This greatly facilitates the ease and economy of manufacture, as well as assembly and disassembly of the rotary tiller blades on the driven tiller shaft by the user. Accordingly, attention is now directed to the configuration are arrangement of the dual end rotary tiller blades 28 as shown in the drawings. Although two embodiments of the dual end rotary tiller blade 28 are shown in FIGS. 3-6 and FIGS. 7-10 respectively, it will be appreciated that other structural configurations and arrangements, within the purview of the present invention, can be made.

In the FIGS. 3-6 and FIGS. 7-10 embodiments, the same reference numerals will be used to designate like parts with the difference between the embodiments being denoted by the suffix "a" for the FIGS. 3-6 embodiment and the suffix "b" for the FIGS. 7-10 embodiment.

Figure 3:
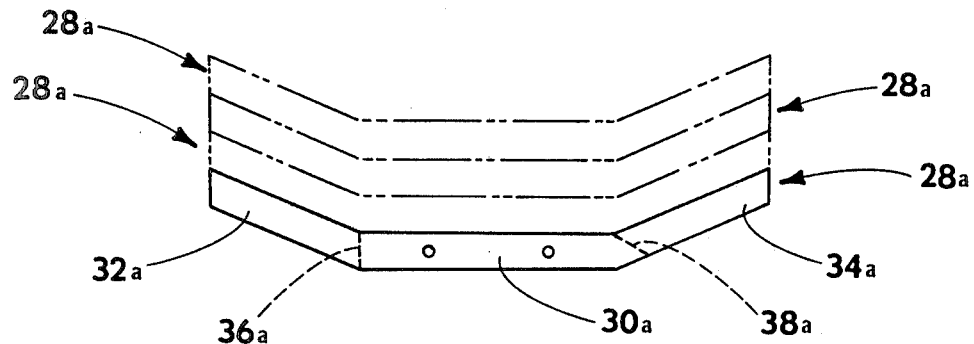
FIG. 3 is a fragmentary top plan view illustrating the generally scrapless method of forming one embodiment of tiller blades of the present invention from sheet steel material.

In the FIGS. 3-6 embodiment, the dual end rotary tiller blade 28a is shown in FIG. 3 as being formed by a generally scrapless method from sheet steel material. More specifically, it will be seen that each rotary tiller blade 28a is formed, from flattened sheet material, with a flattened intermediate section 30a and with opposite marginal end portions 32a, 34a respectively which are angularly offset relative to the flattened intermediate section 30a (at approximately 22½ degrees offset from the intermediate section). Since each dual end rotary tiller blade 28a is identical, it can be seen in FIG. 3 that little scrap is lost because the dual end rotary tiller blades 28a can be easily cut or sheared from the sheet steel material one right after the other.

Figure 4:
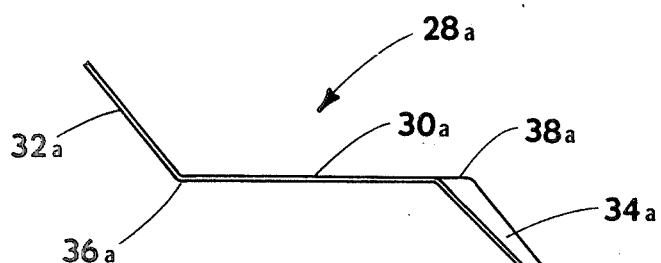
FIG. 4 is an end elevational view of the dual end tiller blade design shown in FIG. 3 that is formed to its final shape.

Following the initial forming step as shown in FIG. 3, the marginal end portions 32a, 34a of each rotary tiller blade 28a are bent in opposite directions from the intermediate flattened section 30a to provide oppositely directed cutting sections or teeth. As best seen in FIGS. 3-4, the marginal end portion 32a is bent at 36a in the area of the juncture between the marginal end portion 32a and intermediate section, while the marginal end portion 34a is bent in an opposite direction to the marginal end portion 32a in an area which is spaced from the juncture between the marginal end portion 34a and intermediate section 30a and is at an angle thereto (approximately 30 degrees offset from the intermediate section). In the FIG. 4 position, the marginal end portion 32a is shown as being bent upwardly while the marginal end portion 34a is shown as being bent downwardly.

Figure 5:
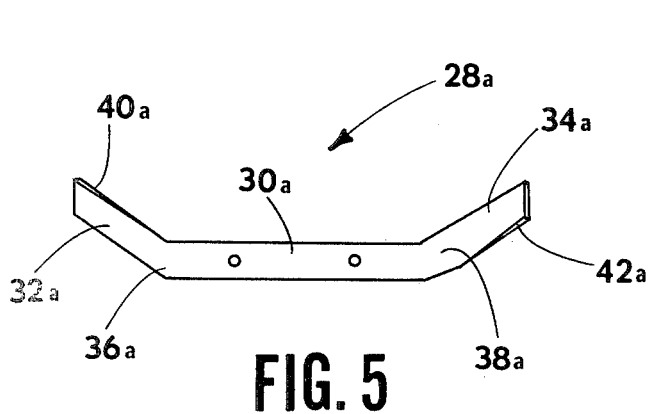
FIG. 5 is a side elevational view of the dual end tiller blade design shown in FIG. 4.
Figure 6:
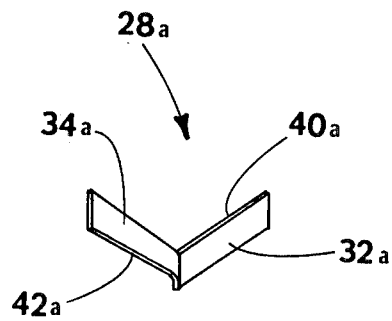
FIG. 6 is a top plan view of the dual end tiller blade embodiment shown in FIGS. 4-5.

When thus formed and bent, the dual end rotary tiller blades 28a provide oppositely directed cutting edges or teeth 40a on marginal end portion 32a and 42a on marginal end portion 34a. This is best seen in FIGS. 5-6 of the drawings. As a result, each blade 28a has a pair of oppositely directed cutting edges or teeth 40a, 42a for engaging the earth. Preferably, the cutting teeth 40a, 42a are sharpened or formed in such a way to slice into the earth.

It will be seen in FIGS. 1-2 that when four dual end rotary tiller blades 28a are mounted on the tiller blade supports 26, adjacent blades 28a are mounted at 90 degrees relative to one another as shown to provide engagement with the earth at 45 degree increments, by alternating adjacent cutting edges or teeth 40a, 42a of adjacent blades 28a. Further, it will be seen that there are four tiller blade supports 26, which secure the blades 28a thereto by suitable fasteners, each of which carry four blades 28i a or a total of 16 rotary tiller blades 28a with thirty-two cutting edges or teeth 40a, 42.

Figure 7:
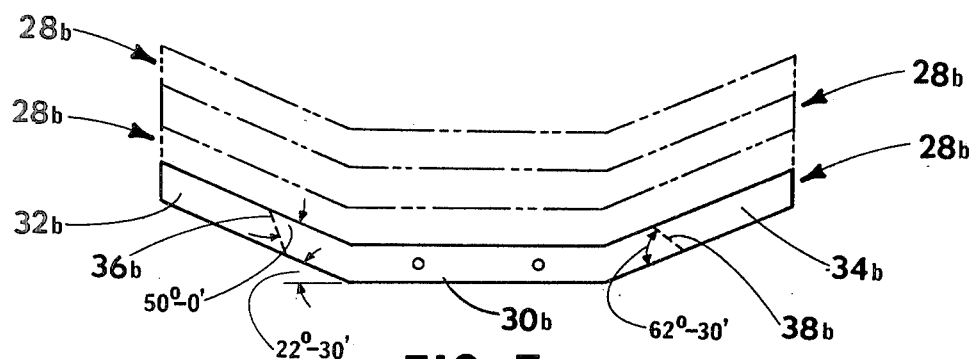
FIG. 7 is a fragmentary top plan view illustrating the generally scrapless method of forming another embodiment of dual end tiller blades of the present invention from sheet steel material.

In the FIGS. 7-10 embodiment, the dual end rotary tiller blades 28b are shown in the initial scrapless method forming step of FIG. 7 as being generally similar in shape to the rotary tiller blades 28a as illustrated in FIG. 3, except that the rotary tiller blades 28b are somewhat longer in order that the blades 28b can overlap adjacent tiller blade support 26. This blade overlapping feature of the FIGS. 7-10 embodiment is best seen in FIG. 2 of the drawings.

Each of the dual end rotary tiller blades 28b, as shown in FIG. 7, include a flattened intermediate section 30b with opposite marginal end portions 32b, 34b that are angularly offset relative to the flattened intermediate section 30b, at approximately 22½ degrees relative thereto.

Figure 8:
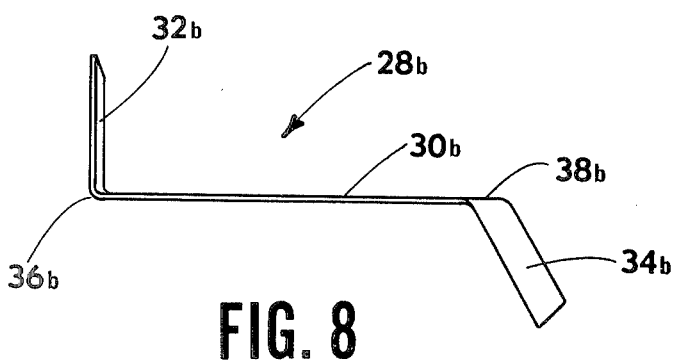
FIG. 8 is an end elevational view of the dual end tiller blade embodiment shown in FIG. 7 which is completely formed to its final shape.

After the initial forming step shown in FIG. 7, the marginal end portions 32b, 34b of each dual end rotary tiller blade 28b are bent in opposite directions from the intermediate flattened section 30b to provide oppositely directed cutting teeth. As best seen in FIGS. 7-8, the marginal end portions 32b, 34b are both bent in an area spaced from the juncture between the marginal end portions 32b, 34b and the intermediate section 30b. More specifically, it will be seen that the marginal end portion is bent at 36b, at an angle of approximately 50 degrees from the marginal end portion 32b, while the marginal end portion 34b is bent at 38b, at an angle of approximately 62½ degrees from the marginal end portion 34b.

Figure 9:
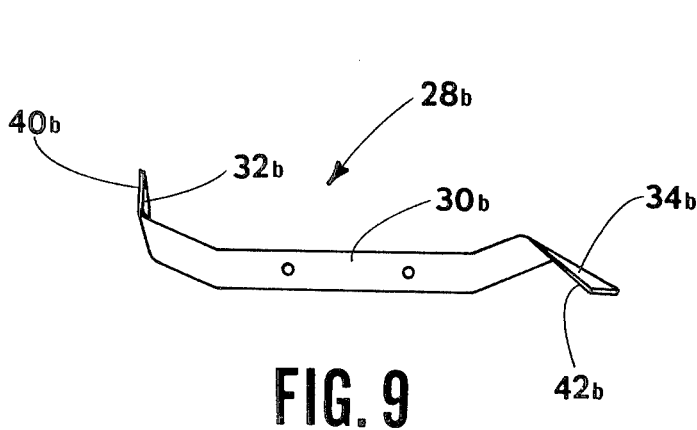
FIG. 9 is a side elevational view of the dual end tiller blade design shown in FIG. 8.
Figure 10:
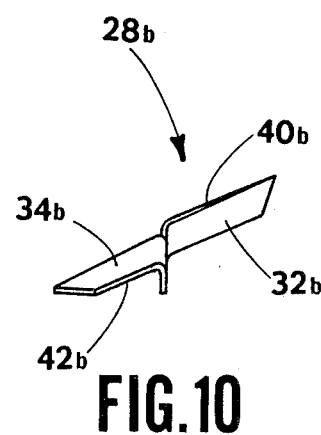
FIG. 10 is a top plan view of the dual end tiller blade embodiment shown in FIGS. 8-9.

FIGS. 8-10 best illustrate the desired form of the dual end rotary tiller blade 28b. As best seen in FIG. 8, the marginal end portion 32b is bent upwardly at 36b while the marginal end portion 34b is bent downwardly at 38b. When formed and bent in this manner, the dual end rotary tiller blades 28b provide oppositely directed cutting edges to teeth 40b, 42b on the marginal end portions 32b, 34b respectively. The oppositely directed cutting edges or teeth 40b, 42b are best shown in FIGS. 9-10.

As compared with the FIGS. 3-6 embodiment, the marginal end portions 32b, 34b, and therefore, the cutting edges or teeth 40b, 42b of the FIGS. 7-10 embodiment, are designed to overlap adjacent marginal end portions 32b, 34b of dual end rotary tiller blades 28b which are mounted on adjacent rotary tiller supports 26 of the driven tiller shaft 24, as is shown in FIG. 2. This overlapping feature assures complete tilling to the depth desired across the full width of earth engagement by the rotary tiller blades.

From the foregoing, it will be appreciated that the dual end rotary tiller blades of the present invention provide improved tiller performance by unique blade design that assures faster tilling, smoother tiller operation and more complete pulverization or ground breaking, and at the same time, will allow simple and economical manufacture of standard type blades.

I claim:

1. A rotary tiller blade for mounting, along with other similar blades, on a driven tiller shaft in a rotary tiller machine, said blade comprising an elongated element with a flattened intermediate section and oppositely directed cutting teeth adjacent the marginal end portions thereof, said marginal end portions being angularly offset relative to the flattened intermediate section of said blade, and said marginal end portions also bent in opposite directions from said intermediate section to provide said oppositely directed cutting teeth, one of said marginal end portions being bent in the area of juncture between the marginal end portion and intermediate section, and the other of said marginal end portions being bent in an opposite direction to said one marginal end portion in an area spaced from the juncture between the other marginal end portion and intermediate section and at an angle thereto.

2. The rotary tiller blade as defined in claim 1 wherein both of said marginal end portions are bent in an area spaced from the juncture between the marginal end portions and the intermediate section, and the angular bend line in said marginal end portions being different 3. A plurality of rotary tiller blades as defined in claim 1 mounted in groups in predetermined positions along the driven tiller shaft, said groups of rotary tiller blades being mounted in equidistant spacing at approximately 90 degrees relative to one another in each group.

4. The plurality of rotary tiller blades as defined in claim 3 including four rotary tiller blades mounted in each group to provide eight cutting teeth in each group.

5. The plurality of rotary tiller blades as defined in claim 4 including four groups of four rotary tiller blades mounted on said driven tiller shaft to provide thirty-two cutting teeth along said driven tiller shaft.

* * * * *